United States Patent
Sakakibara et al.

[11] Patent Number: 5,510,938
[45] Date of Patent: Apr. 23, 1996

[54] TRACKING CONTROL APPARATUS WHICH USES PILOT SIGNALS TO CONTROL A CAPSTAN

[75] Inventors: Yoshio Sakakibara, Neyagawa; Makoto Gotou, Nishinomiya; Haruo Isaka, Yawata, all of Japan

[73] Assignee: Matsushita Electric Industrial Co., Ltd., Kadoma, Japan

[21] Appl. No.: 142,865

[22] Filed: Oct. 25, 1993

[30] Foreign Application Priority Data

Oct. 23, 1992 [JP] Japan ..... 4-285767
Oct. 30, 1992 [JP] Japan ..... 4-292457

[51] Int. Cl.$^6$ ............... G11B 5/584; G11B 5/58
[52] U.S. Cl. .................. 360/77.14; 360/77.12
[58] Field of Search ............ 360/73.11–73.14, 360/77.13–77.15, 10.3

[56] References Cited

U.S. PATENT DOCUMENTS

| | | | |
|---|---|---|---|
| 4,630,146 | 12/1986 | Takayama et al. | 360/77 |
| 4,811,129 | 3/1989 | Kubo | 360/73.12 |
| 4,811,130 | 3/1989 | Takayama | 360/73.11 |
| 4,899,233 | 2/1990 | Yoshida | 360/77.14 |
| 4,945,426 | 7/1990 | Okamoto et al. | 360/73.14 |
| 5,123,002 | 6/1992 | Tateishi | 369/44.32 |
| 5,182,681 | 1/1993 | Yamazaki | 360/70 |

Primary Examiner—Andrew L. Sniezek
Assistant Examiner—Larry Cullen
Attorney, Agent, or Firm—Ratner & Prestia

[57] ABSTRACT

An information reproducing apparatus for reproducing information recorded on slant information tracks includes magnetic heads mounted on a rotary cylinder. The magnetic heads scan a magnetic tape which has slant information tracks on which tracking pilot signals are formed. A tracking error detector detects the tracking error signal of the magnetic head scanning using the tracking pilot signal recorded on the slant information tracks. The tracking error detector then generates a tracking error signal indicating the amount of the track bending. A control signal generator generates a control signal in response to the tracking error signal for controlling the scanning position of the magnetic head. A tracking controller controls the slant track scanning position of the magnetic head.

1 Claim, 7 Drawing Sheets

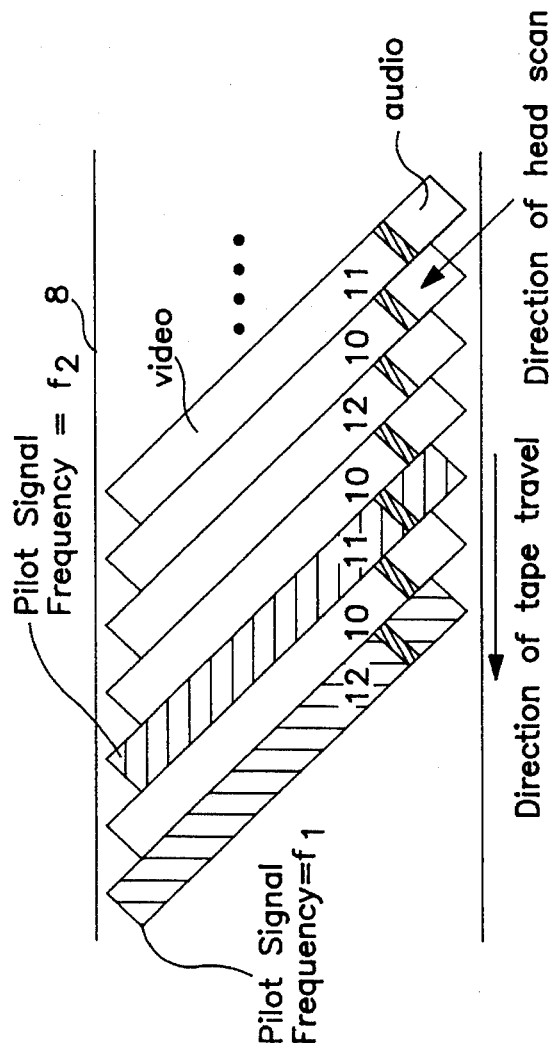
FIG. 2
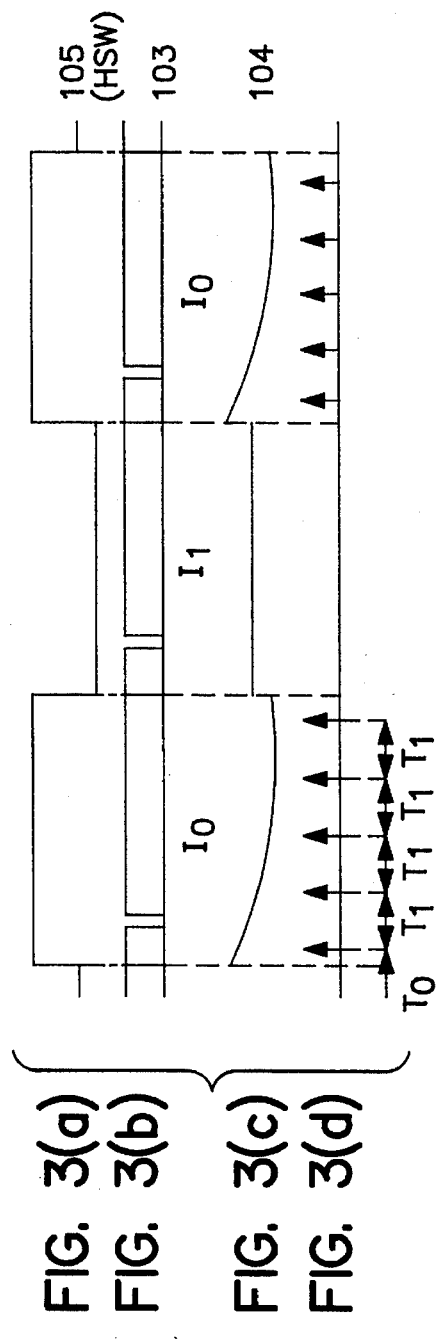
FIG. 3(a)
FIG. 3(b)
FIG. 3(c)
FIG. 3(d)

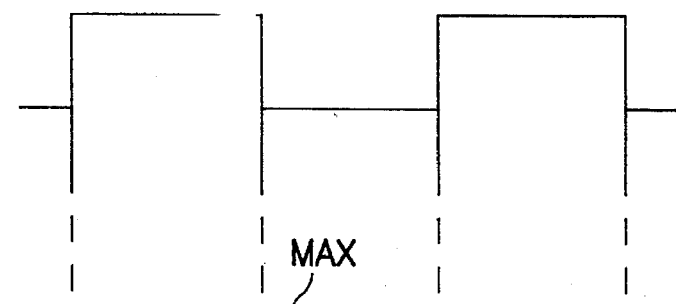
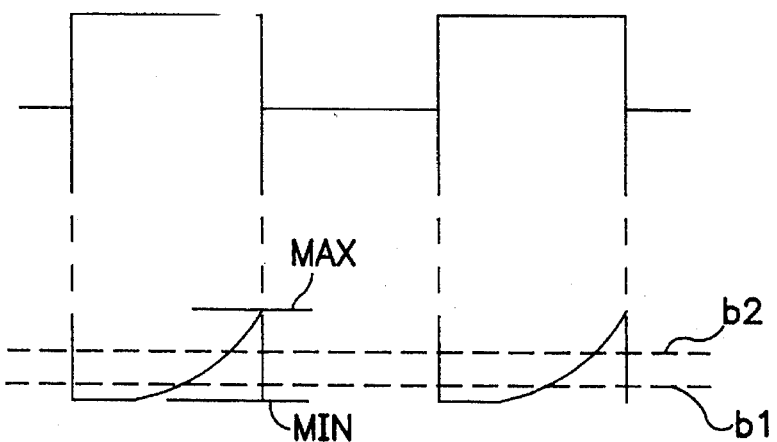
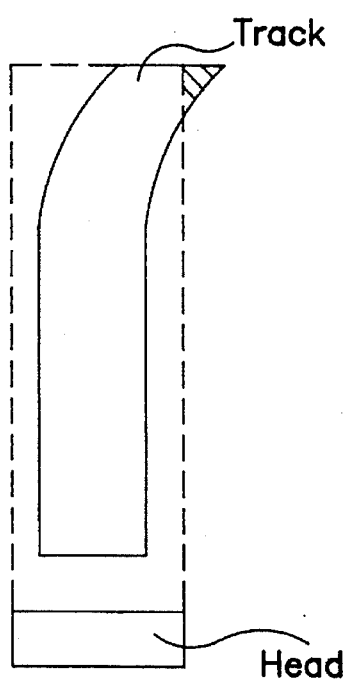
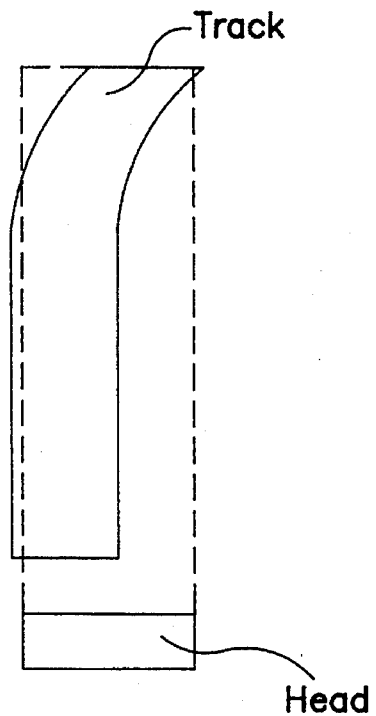

TRACKING CONTROL APPARATUS WHICH USES PILOT SIGNALS TO CONTROL A CAPSTAN

BACKGROUND OF THE INVENTION

Information recording and reproduction apparatuses such as a video tape recorder (VTR), use magnetic tape as a recording medium. Slanted tracks are formed across the magnetic tape using rotary magnetic heads. These apparatuses are used in home recreation, business, broadcasting, information processing, and other fields.

These apparatuses use tracking control so that the magnetic reproducing head can correctly scan the recording tracks. This is done so that information can be reproduced stably from the recording tracks and to provide compatibility between apparatuses. One VTR uses a control signal recorded on a track to perform tracking control. The control signal is recorded in a relative position in relation to the slant tracks in the lower edge area of the magnetic tape. However, since the positional deviation between the recorded control pulses on the control track and the oblique tracks could not be eliminated completely, it has been necessary to adjust the deviation manually.

In another VTR, to eliminate this problem, an automatic method of adjusting is employed. The automatic method detects the envelope of the reproduced signal, and the tracking phase where the envelope reaches a maximum is identified while slightly shifting the tracking phase. As a result the scanning of the magnetic head is locked to that phase.

In another method, the envelopes at a plurality of points on one track are sampled. Tracking is controlled by detecting the phase in which the minimum value of these sampling values is maximized.

Problems with these conventional tracking methods are that an appropriate reproduction state is not reached promptly because it takes time to find the optimum on-track phase, and that the conventional tracking methods typically require means for detecting the envelope of the reproduced signal as well as the means for performing ordinary tracking control.

In the rotary head digital audio tape recorder (R-DAT), an area for automatic track following is provided in the slant track. Tracking is controlled by using the signal recorded in the area. This system is known as the automatic track following (ATF) system. In this method, the tracking servo circuit operates to set on track automatically. Manual adjustment is not needed.

High density recording using these apparatuses has been accomplished by narrowing the pitch of slant tracks on the magnetic tape. However, as the track pitch becomes narrower, the effect of track bending caused by mechanical factors becomes less ignorable. Track bending occurs when the slant track recording on the magnetic tape meanders against the scanning of the magnetic head. As a result, the normal recorded signal cannot be reproduced from the magnetic head. One technique for improving the reproduction quality in such circumstance is to correct the tracking phase by providing tracks which record tracking information on the tape at plural points in one track and by obtaining the track bending information therefrom when reproducing. This technique nullifies the mean of the tracking errors. This technique is effective for the reproduction of analog information because the means S/N is improved. However, reproduction of digital information may result in lowering S/N which may reach a region in which the error cannot be corrected since the technique corrects the tracking phase using information representing the track bending. Optimum track phase cannot always be set for recording and reproducing digital signals.

SUMMARY OF THE INVENTION

The present invention relates to an information reproducing apparatus for use with apparatuses having narrow tracks of high density recorded in slanted direction on a magnetic tape.

The information reproducing apparatus according to the exemplary embodiments of the present invention are less affected by the bending of the recording track when reproducing a digital signal on a recorded magnetic tape.

The present invention also relates to an apparatus which is capable of responding to track bending at high speed using few additional means.

The information reproducing apparatus according to an exemplary embodiment of the present invention comprises a magnetic head provided on a rotary cylinder. The magnetic head is for reproducing the recorded information from the information contained in a tracking pilot signal which is recorded on the slant tracks across the magnetic tape. A tracking error detecting means is provided for detecting a tracking error while the magnetic head is scanning from the slant information track by detecting the tracking pilot signal. A control signal generating means is for generating a control signal for controlling the scanning position of the magnetic head in response to the bending pattern of the slant information track as indicated by the tracking error signal. A tracking control means is also provided for controlling the slant information track scanning position of the magnetic head in response to the output of the control signal generating means.

The information reproducing apparatus according to an exemplary embodiment corrects the head scanning position in response to track bending. Since the signal for ordinary tracking control is used for detection of track bending, searching for the optimum position is not needed.

The control signal generating means, by producing the mean of the maximum and minimum of the tracking error signals in a specified scanning period length, can lower the reproduced signal amplitude. This enhances the quality of the reproduced signals. This is compared with the control of the mean by using the entire tracking error signals.

The information reproducing apparatus according to the exemplary embodiment is capable of reproducing the information on a tape where track bending effect is relatively increased due to narrowing of the track. The optimum reproduced signal quality is given in this circumstance.

The invention will be better understood and appreciated from the following detailed description taken in conjunction with the accompanying drawings.

BRIEF DESCRIPTION OF THE DRAWINGS

FIG. 2 is a pattern diagram of an information recording track in accordance with the first exemplary embodiment of the invention.

FIG. 3 is a timing chart for explaining the operation of the first exemplary embodiment of the present invention.

FIG. 9 is a waveform diagram for explaining the tracking control operation of the exemplary embodiments of the present invention.

FIGS. 10(a) and 10(b) are schematic diagrams for explaining the head tracking state of the exemplary embodiments of the present invention.

DESCRIPTION OF THE PREFERRED EMBODIMENTS

Figure 1:
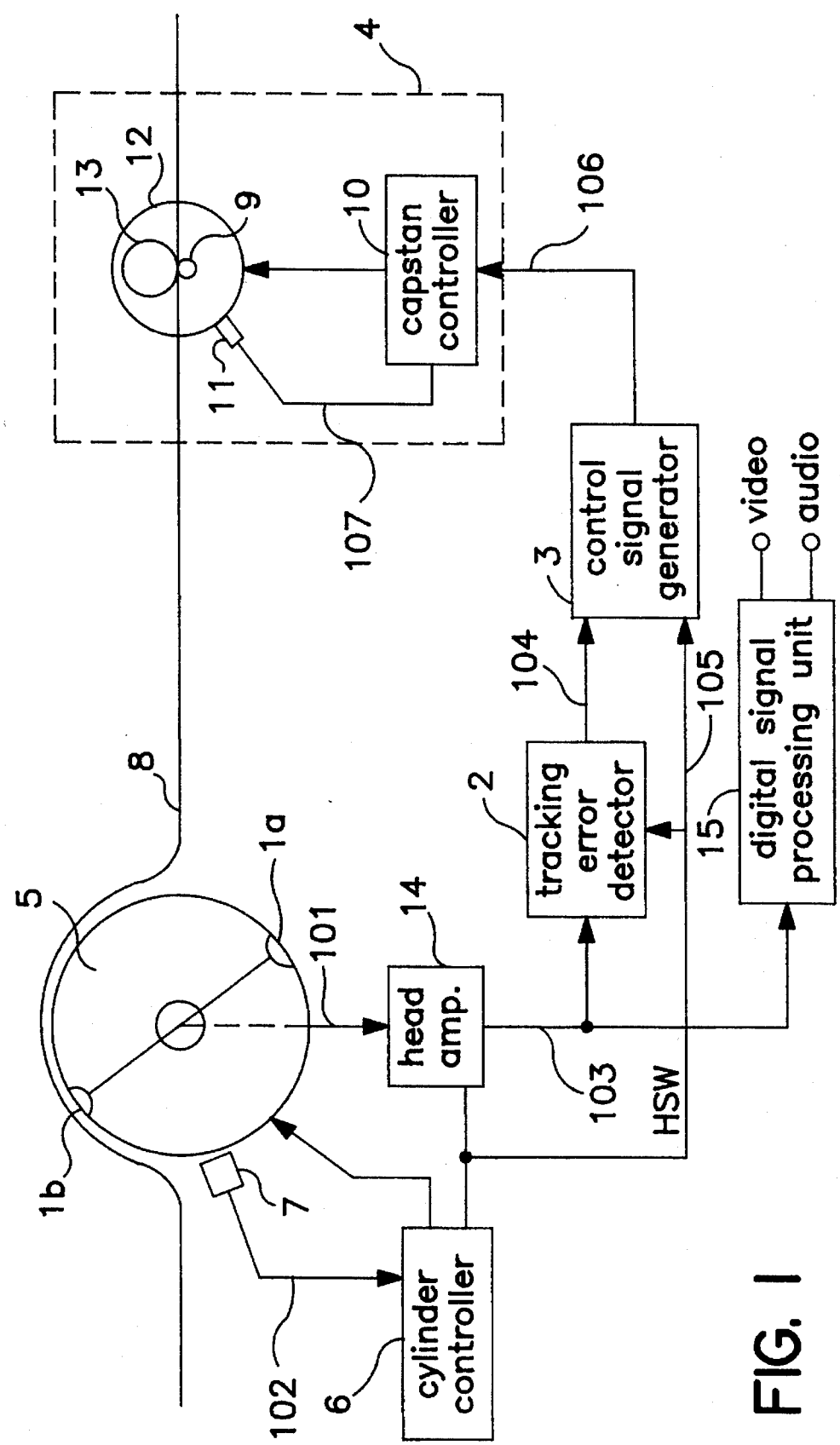
FIG. 1 is a block diagram of an information reproducing apparatus in accordance with first exemplary embodiment of the invention.

Referring now to the drawings, an information reproducing apparatus according to the exemplary embodiments of the present invention are described in detail below.

FIG. 1 is a block diagram showing an information reproducing apparatus according to a first exemplary embodiment of the present invention. Magnetic heads 1a, 1b (heads) have mutually different azimuth angles, and are mounted 180° apart on a cylinder 5. The cylinder 5 contains a motor, which is not shown, for rotating it. Cylinder controller 6, controls the rotation of the cylinder 5 by altering the rotational speed of the cylinder 5 in response to a phase signal 102 from a rotational detector 7. A head amplifier 14 amplifies a head reproduced output signal 101. A tracking error detector 2, and a control signal generator 3 are also provided. A capstan 9, directly coupled to a capstan motor 12, which is not shown, and a pinch roller 13 are provided. A magnetic tape 8 is placed between the capstan 9 and pinch roller 13 which cause the tape 8 to travel in the longitudinal direction by rotation of the capstan 9. The tape 8 is also wrapped about the cylinder 5 overabout 180°. Tape 8 is helix scanned as the tape passes over cylinders by the rotating heads 1a, 1b. A capstan controller 10 adjusts the rotation of the capstan motor 12 in response to a rotational speed signal 107 from a rotational detector 11. By adjusting the speed of the capstan motor 12 the capstan controller 10 controls the rotational speed of the capstan 9. A tracking controller 4 is identified by the broken line box. A digital signal processing unit 15, demodulates the output of the head amplifier 14 into video signal and audio signals.

The operation of the first exemplary embodiment is explained below. The rotational speed of the capstan 9 is controlled a by the capstan controller 10. The tape 8 travels at a specific speed set by the capstan 9. The cylinder 5 is maintained at specific rotational speed and rotational phase by the cylinder controller 6. The heads 1a, 1b scan the tape 8 successively in the oblique direction during the rotation of the cylinder 5, and reproduce the signal from the information track formed in the diagonal direction on the tape 8. The cylinder controller 6 distinguishes which one of the heads 1a, 1b is scanning the tape 8 from the rotational speed and phase signal 102. The cylinder controller 6 also generates a distinguishing signal (HSW) 105. The HSW signal 105 is a binary signal as shown on line (9) of FIG. 3(a), and indicates that the head 1a is scanning the tape 8 in the period of high level, and that the head 1b is scanning in the period of low level. The output signals of the heads 1a, 1b are selected during their corresponding scanning periods of the tape 8 by the HSW signal 105. The scanned signals are amplified by the head amplifier 14 which generates a reproduced signal 103.

FIG. 2 is a diagram showing the array of information slant tracks recorded on the tape 8 shown in FIG. 1. The information tracks are formed adjacently to each other without a guard band. Each information track is composed of two regions divided by a gap, indicated by the shaded area, for editing purposes. In each region, digitized audio signals and video signals are recorded together with an error correction code. Pilot signals for tracking are recorded by frequency multiplex on the tape 8 with the audio and video signals. The tracks without a pilot signal recording are indicated by numeral f0. Pilot signals having two different frequencies are indicated by f1, f2. These two pilot signals f1 and f2 are alternately recorded. The track indicated by f0 is recorded at the same azimuth angle as the head 1a, while the recorded tracks of pilot signals of f1, f2 are recorded at the same azimuth angle as the head 1b. The method of superposing the pilot signals on the digital signal is disclosed, for example, in the European Patent Publication No. 339724 which is incorporated herein by reference, and the explanation is omitted herein.

By using the reproduced signal 103 obtained from the track, the tracking error detector 2 detects the deviation of the head and track, and produces a tracking error signal 104. Specifically, while the head 1a scans the track of f0, components of pilot signals f1, f2 leaking in from the adjacent right and left tracks are detected and compared. Therefore the deviation can be detected.

Figure 4:
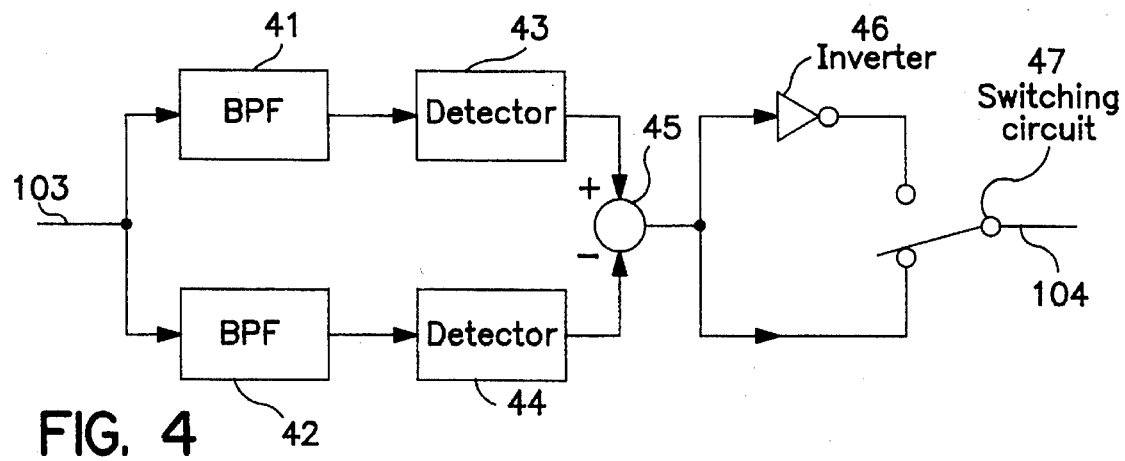
FIG. 4 is a schematic diagram showing the tracking error detector 2 of the first exemplary embodiment shown in FIG. 1.

FIG. 4 is a schematic diagram showing tracking error detector 2 of FIG. 1. While the head 1a scans the track of f0, frequency components of pilot signals f1 and f2 of adjacent right and left tracks which are crosstalking are extracted by bandpass filters 41 and 42. Their amplitudes are detected by detectors 43 and 44, and the difference of component f1 and component f2 is determined by a subtractor 45. This differential signal directly passes through a switch circuit 47, and appears at the output side as the tracking error signal 104.

On the other hand, while the head 1b is scanning the tracks of F1, F2, deviation cannot be detected, and the output is fixed in this period by using the HSW signal 105. In this example, however, the signal in this period is not used as described later, therefore, this processing is not essential. Since the configuration of the pilot signals f1, f2 as seen from the head 1a is inverted during every scanning interval, the polarity of the error signal is desirably inverted during every scanning by using an inverter 46 and the switch circuit 47 before producing the output. Examples of waveforms of reproduced signal 103 and tracking error signal 104 are shown in FIG. 3 lines (b) and (c). A waveform depending on the track bending appears in the tracking error signal 104.

The control signal generator 3 receives the tracking error signal 104 and HSW signal 105, detects the track bending, and then produces a corresponding control signal 106. In this example, the control signal generator 3 includes a microprocessor which comprises A/D converter, D/A converter, ROM, RAM, timer and CPU integrated in one chip. The operation of the control signal generator 3 is described in detail later.

The tracking controller 4 controls tracking by responding to the control signal 106. In this example, tracking control is performed by the capstan controller adjusting the tape speed in response to the control signal 106.

The digital signal processing unit 15 receives the reproduced signal 103, and processes it using binary coding, clock generation, demodulation, error correction, etc., and produces a reproduced video signal and a reproduced audio signal.

Figure 5:
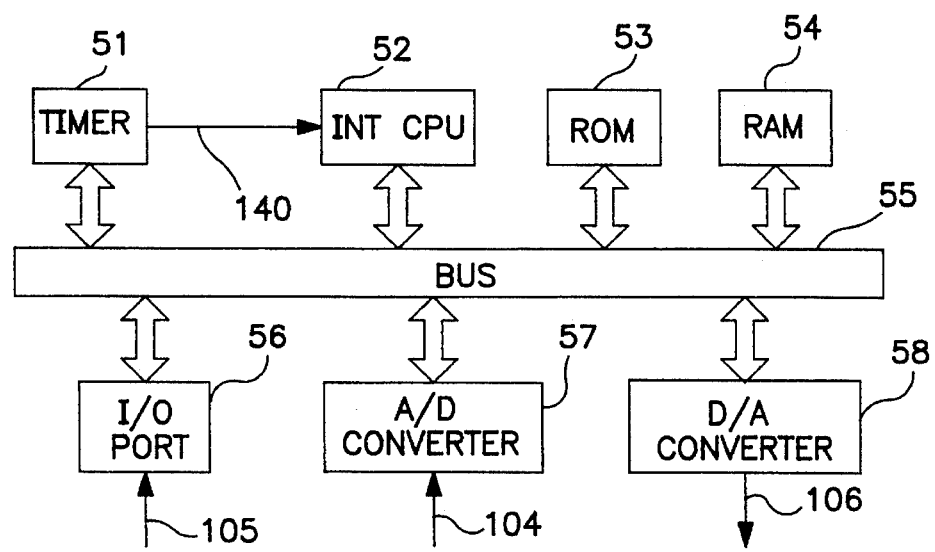
FIG. 5 is a block diagram of a microcomputer which is the control signal generator 3 of the first exemplary embodiment shown in FIG. 1.

FIG. 5 is a block diagram of the microcomputer which constitutes the control signal generator 3. It includes a timer 51, a CPU 52, a ROM 53, a RAM 54, a I/O port 56, an A/D converter 57, and a D/A converter 58. The CPU 52 and other units exchange data through a bus 55. The CPU 52 carries out the processing according to a program stored in the ROM 53.

Figure 6A:
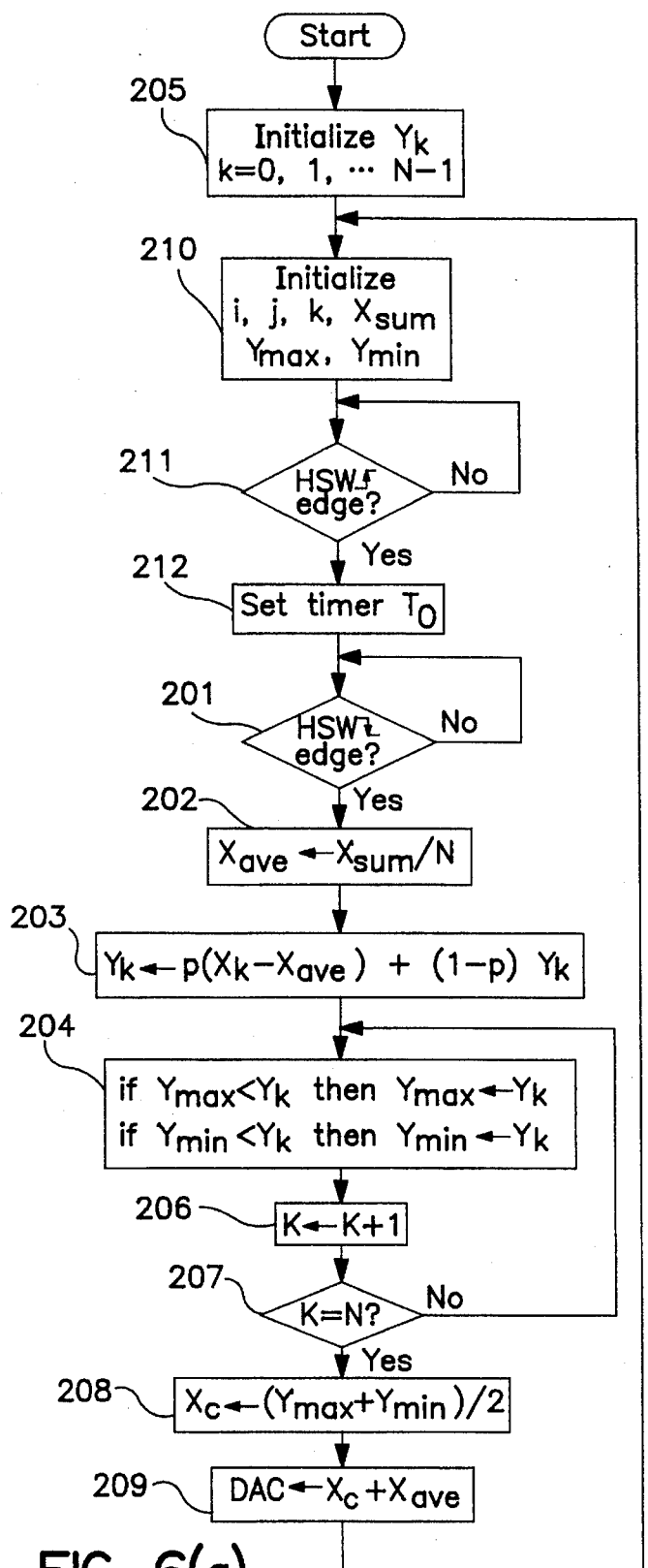
FIGS. 6(a) and 6(b) are flow charts of the error signal generating procedure in accordance with the exemplary embodiment of the present invention.
Figure 6B:
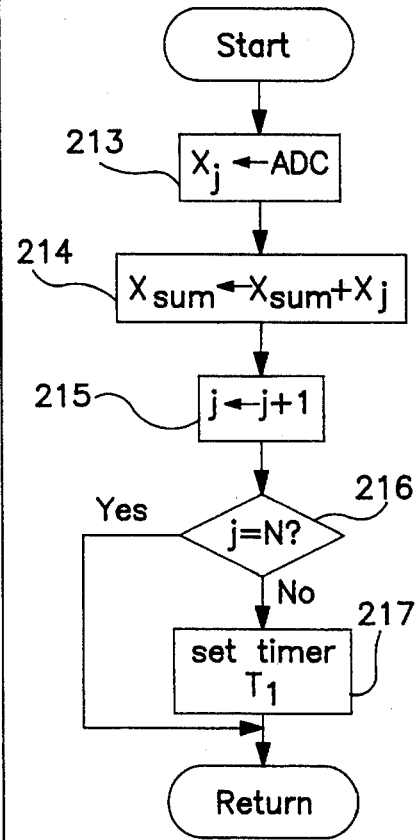

FIGS. 6(a) and 6(b) are flow charts showing the outline of the program stored in the ROM 53. FIG. 6(a) relates to a main routine, and FIG. 6(b) is a timer interrupt routine. The timer 51 is set at a specific value by the program. The timer 51 issues an interrupt signal 140 after the expiration of the set time. The CPU 52 usually executes the main routine sequentially, but when an interrupt signal is issued, it temporarily stops the processing of the main routine, and processes the timer interrupt routine.

In operation, the content of the RAM 54 to be used at steps 205, 210 is initialized. All of the values Yk (k=0, 1, . . . , N-1), i, j, k, and Xsum are set to 0. Ymax and Ymin are at the minimum value and maximum value of the output dynamic range of the A/D converter 57, respectively. At step 211, the value of the HSW signal 105 at the I/O port 56 is monitored, until a rising edge is detected. At step 212, the value TO, shown in FIG. 3, line (d), is set in the timer 51. At step 201, as the value of the HSW signal 105 is monitored until a falling edge of the HSW signal 105 is detected. During this period, a timer interrupt occurs, thus causing the timer interrupt routine shown in FIG. 6(b) to be executed.

In the interrupt routine, the sum of the sampling of tracking error signal 104 and sample values in one scanning is calculated. First, at step 213, the value of tracking error signal 104 is read into RAM (Xj) through the A/D converter 57. At step 214, the value of (Xj) is added to RAM (Xsum). At step 215, the RAM (j) is incremented. At step 217, the timer 51 is set to a value corresponding to the T1 period shown in FIG. 3, line (d) in order to generate the next timer interrupt. However, if the value of j at step 216 is equal to N (N being a positive integer constant, N=5 in this example), it is judged that processing for one scanning period is over, and step 217 is skipped. In this way, the timer interrupt processing is completed and the execution returns to the main routine.

In this process, the timer interrupt occurs repeatedly as shown in FIG. 3, line (d) during the high level period of the HSW signal 105, that is, while the head 1a is scanning the track of f0. As a result, when one scanning period is over, the sample values Xj (j=0, 1, . . . , N-1) of the tracking error signal 104 are obtained at each timing interval and the sum Xsum of the sample value $X_1$ are obtained.

When the fall of the HSW signal 105 is detected at step 201 of the main routine, Xsum/N is then calculated at step 202, and the result is stored in the RAM (Xave). The result is the average of the sample values of tracking error signals obtained in one scanning. Steps 203, 204, 206, and 207 are the processing steps for detecting track bending. Steps 203 and 204 are repeatedly executed for each k value from k=1 to k=N as determined by steps 206 and 207. Step 203 performs low pass filter processing in order to remove noise in the substantial track bending portions by subtracting the average Xave from each sample value Xj.

Track bending is often caused by rotation of the cylinder 5. As a result, there is a strong correlation between track bending and rotation of the cylinder 5 during scanning. By making use of this fact, filter processing is accomplished. Herein, the coefficient p is a constant defined by $0<p\leq 1$. When p is closer to 0, the noise removing effect is greater, but the convergence is slower. When P is closer to 1, the convergence is fast, but the noise removing effect is small. Therefore it is preferred to determine the value of p depending on the track bending in the applied recording medium (the ratio of period component and other components), and the quality level of the detected tracking error signal 104. The sample value after processing is Yk (k=0, 1, . . . , N-1). Step 204 is for detecting the maximum value Ymax and minimum value Ymin and also Yk.

Step 208 is the process for calculating the correction amount from the filtered track bending information Yk. This calculation is discussed below. Usually, the head used in reproduction is broader than the track width, and if the track bending is equal to or less than (head width-track width) it is possible that the signal may be reproduced without lowering of the level. Actually, however, when tracking control assigns the average error signal to zero, lowering of the signal level may occur depending on the particular circumstances. This phenomenon occurs when the center of the track bending does not coincide with the average of the tracking error signal. However, when tracking control searches for the center of track bending, lowering of reproduced signal amplitude may be eliminated.

If track bending exceeds (head width-track width), lowering of amplitude may be suppressed to a minimum.

In digital signal reproduction, generally, an error correction code is preliminarily added to the recorded signal, and it is used during reproduction to correct an error and when the error is within its correction capacity range, there is no effect on the final reproduction output, that is, the reproduced video signal and reproduced audio signal in this case. Therefore, when the lowering of reproduced signal amplitude to a minimum is suppressed the final reproduced output quality is less susceptible to the effect of track bending.

Since the average Xave has been preliminarily subtracted from each sample at step 203, the correction amount Xc is the difference between the center of track bending and the average Xave. The correction amount Xc and tracking error signal are combined at step 209. This is accomplished by adding the average Xave of the tracking error signal in one scanning to the correction amount Xc. The obtained sum is issued as output signal 106 through the D/A converter 58. Returning to step 210 after a series of processing in this way, the content of the RAM is initialized to wait for start of next scanning.

According to the exemplary embodiment, the correction amount of the tracking position depends on the track bending detected by the control signal generator 3, which is combined with the tracking error signal. The tracking controller 4 operates this combined value. Therefore the effect of track bending on the reproduced signal amplitude may be kept to a minimum limit. In addition, since the correction amount is updated during every scanning period of the head 1a the correction response is quicker, and a arbitrary response is obtained by the filter coefficient p.

The correction amount Xc and tracking error signal can be combined using other methods not disclosed in this exemplary embodiment for correcting the target position of the tracking control. For example, skipping step 209, right after step 213, (Xc+Xj) may be produced through the D/A converter 58. Thus, the delay time from sampling to output is shortened, and the delay caused by averaging does not occur hence the response of the tracking control can be accelerated.

Figure 7A:
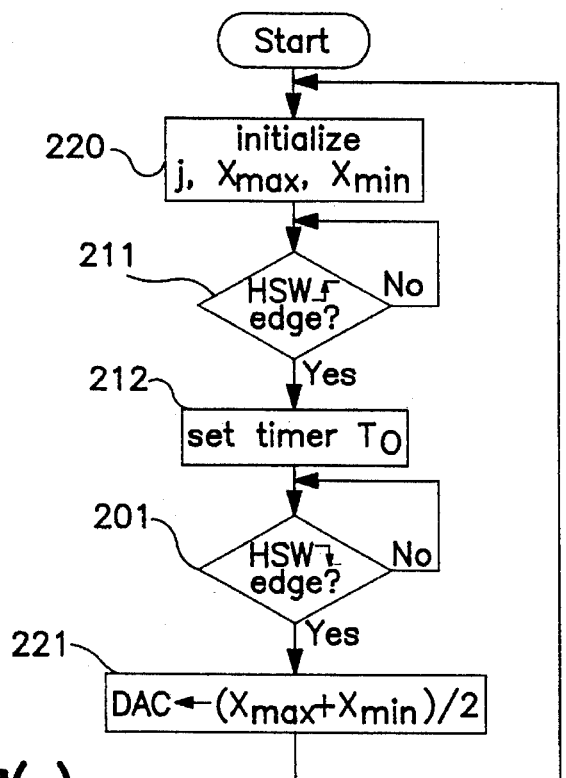
FIGS. 7(a) and 7(b) are flow charts of an error signal generating procedure in accordance with a second exemplary embodiment of the present invention.
Figure 7B:
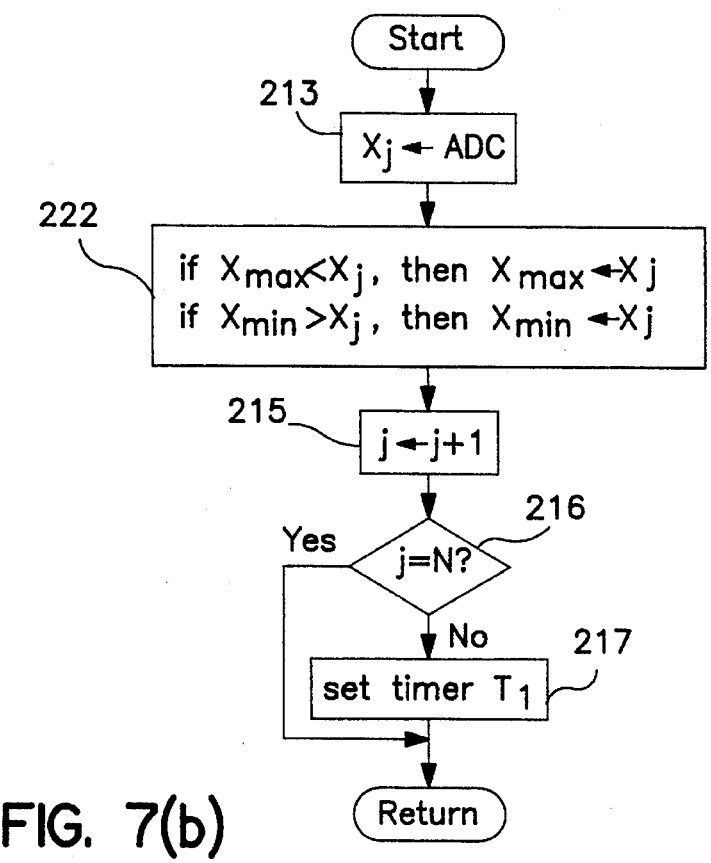

Another exemplary embodiment is described below with reference to FIGS. 7(a) and 7(b). The general construction of is similar to the one in FIG. 1, except that the program of the microcomputer composing the control signal generator 3 is different. A flow chart of the program is shown in FIGS. 7(a) and 7(b). FIG. 7(a) relates to a main routine, and FIG. 7(b) shows a timer interrupt routine. In the main routine, the RAM to be used is initialized at step 220. Assuming j is 0, Xmax and Xmin are respectively preset at the minimum and maximum of the output dynamic range of the D/A converter 57. The actions at step 211, 212, 201 are the same as the corresponding steps in FIG. 6(a). The timer 51 is set by waiting for the rising edge of the HSW signal 105. While waiting for the falling edge of the HSW signal 105 at step 201, a timer interrupt occurs which starts the timer interrupt routine of FIG. 7(a). In the timer interrupt routine shown in FIG. (b), the tracking error signal 104 is stored in Xj through the A/D converter 57 at step 213. The maximum Xmas and minimum Xmin are detected at step 222 in one scanning period. Steps 215, 216, 217 set the time for next timer interrupt in the same manner as the timer interrupt routine of FIG. 6(b). The interrupt timing is shown in FIG. 3, line (d). Returning to the main routine, when the falling edge of the HSW signal 105 is detected at step 201, the maximum Xmax and minimum Xmax of Xj are obtained. At step 221, the average of Xmax and Xmin is calculated, that is, the value corresponding to the center of track bending, as the target of tracking control, is produced through the D/A converter 58.

Thus, in this exemplary embodiment, the effect of track bending on the reproduced signal amplitude can be suppressed to the minimum limit. This is accomplished by detecting the maximum and minimum of the tracking error signal in one scanning period in the control signal generator 3, and by producing their average as the control signal. The response of this embodiment is fast because the correction amount is set in ever scanning period of the head 1a. This exemplary embodiment is particularly effective where the quality of tracking error signal is relatively high, or where the system has a small periodicity of track bending.

Figure 8A:
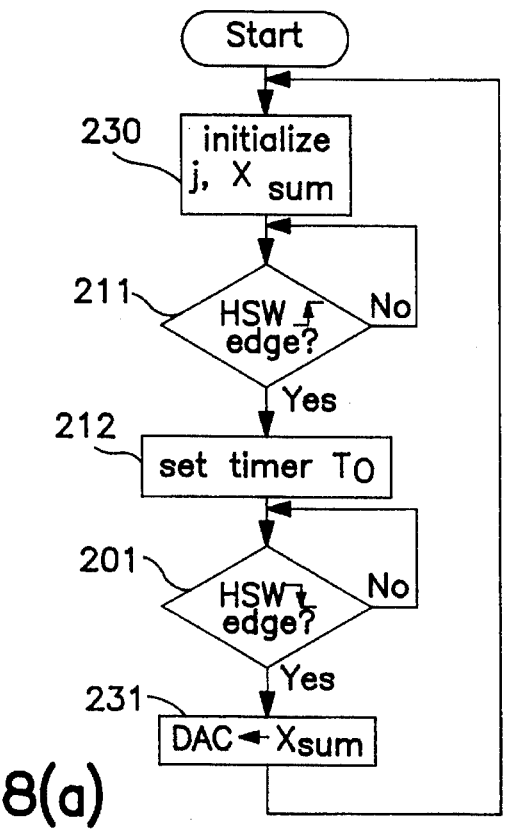
FIGS. 8(a) and 8(b) are flow charts of an error signal generating procedure in accordance with a third exemplary embodiment of the present invention.
Figure 8B:
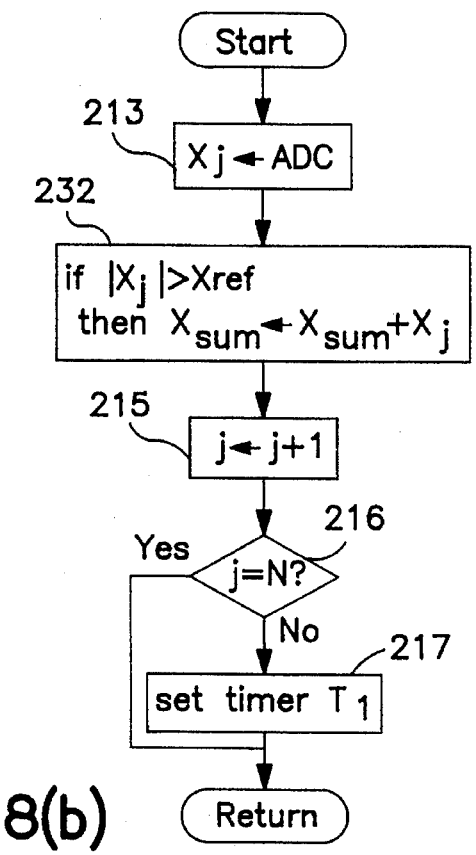

A different exemplary embodiment is explained below with reference to FIGS. 8(a) and 8(b). In the foregoing two exemplary embodiments, the control signal was created in order to eliminate lowerreproduced signal amplitude caused by track bending, or to minimize the maximum lowering value. However, if lowering of the reproduction amplitude is inevitable because of a large bending of the track, the following exemplary method can be used effectively in this situation.

The general construction of the system is the same as shown in FIG. 1, except that the program of the microcomputer for composing the control signal generator 3 is different. FIGS. 8(a) and 8(b) show flow charts of the program. FIG. 8 (a) is a main routine, and FIG. 8(b) is a timer interrupt routine.

In the main routine, the RAM to be used is initialized at step 230. Both j and Xsum are 0. Steps 211, 212, 201 are the same as in the exemplary embodiment of FIGS. 6(a) and 6(b), that is, the timer 51 is set by waiting for the rising edge of the HSW signal 105. While waiting for the falling edge of the HSW signal 105 at step 201, a timer interrupt occurs. This starts the timer interrupt routine. In the timer interrupt routine FIG. 8(b), the tracking error signal 104 is stored in Xj through the A/D converter 57 at step 213. When the absolute value of Xj at step 232 is greater than a constant Xref, Xj is added to Xsum. Steps 215, 216, 217 are timer setting process for the next timer interrupt which is the same as exemplary embodiment of FIGS. 6(a) and 6(b). The interrupt timing is shown in FIG. 3, line (d).

Returning to the main routine, Xsum is produced as a control signal through the D/A converter 58 at step 231. Herein, Xref, for example, is a value corresponding to (head width-track width)/2 which acts to suppress the sum (integrated value) of one scanning period of the lowered portion of the reproduced signal amplitude. Or Xref acts to actually suppress the effect on the quality of the reproduced output wherein the tracking error amplitude corresponds to the amplitude. This effect may appear in the quality after demodulation of the reproduced signal as Xref (for example, the clock reproduction PLL is deviated, or the error rate exceeds the correction limit). Incidentally, the addition processing at step 232 may be set so that the amount of the absolute value of Xj exceeding Xref may be added to Xsum.

In this way, according to this exemplary embodiment, the control signal generator 3 produces the value corresponding to the tracking error signal in the period when the absolute value in one scanning period is in excess of a specific value, such as the control value. Therefore, tracking control is substantially performed by focusing on the position where the effect on the reproduced output may be finally suppressed. Since the control signal is set in one scanning, fast response is possible.

Various exemplary embodiments of the control signal generator 3 have been explained. The control signal generator 3 is a vital part in the tracking control of the information reproducing apparatus. To further clarify the effect of the present invention, it is compared with the conventional control method with reference to FIGS. 9 and 10.

FIG. 9 is a waveform diagram for explaining the action of tracking control according to an exemplary embodiment of the present invention. FIGS. 10(a) and 10(b) is a schematic diagram for explaining the tracking state of the head. In FIG. 9, line (a) shows the head switch signal HSW 105 for distinguishing the head, and line (b) denotes a tracking error signal 104. The waveform diagram in FIG. 9 indicates that a large track curvature occurs near the terminal end of a track. Broken line b1 represents the average of the tracking error in one scanning period, and single dot chain line b2 refers to the average of the maximum and minimum of tracking error. The prior art control operates in the center of control of broken line b1 so that the DC component of tracking error may be 0. As a result, the tracking error increases upward, and the reproduced output signal in that area is largely lowered.

In the prior art apparatus for reproducing analog information, S/N of the reproduced signal determines the S/N after final demodulation. The average control indicated by broken line b is desired so that a favorable S/N may be obtained in the majority of the track. In the apparatus for reproducing digital information, on the other hand, the tracking position itself does not effect the final quality of the output signal so long as it is in the range in which the digital data is normally reproduced, or where error correction is possible. That is, it is not the control for minimizing the tracking error that is important. What is important to control the tracking so that it may not go out of the range in which the digital data can be reproduced normally or where error correction is possible. It is also important to the control to decrease the maximum value of lowering of the reproduced signal amplitude.. To minimize lowering of the reproduced signal, one method distributes the magnitude of the residual tracking error equally on both polarities as in this exemplary embodiment. The single dot chain line b2 indicates such a control signal.

FIGS. 10(a) and 10(b) show the difference in tracking state using these two control methods. In FIGS. 10a) and 10(b), the track curvature is schematically shown. The head scanning trace by the control system of the conventional average action type is indicated by the broken line in FIG. 10(a), and the head scanning trace by the control system of this exemplary embodiment is indicated by the broken line in FIG. 10(b). According to the conventional control system, as shown in FIG. 10(a), the recording track is largely out of the head scanning trace as indicated by shaded area. Therefore the reproduced signal amplitude is lowered, and error correction is disabled in a digital recording. However, in the control system of the exemplary embodiment, as shown in FIG. 10(b), the head scans the recording track without disabling the error correction region.

As explained herein, the invention relates to an information reproducing apparatus capable of reproducing information usingthe error correction function if there is a curvature of the recording track in a digital recording. The form of the tracking control signal is not limited to the forms shown in the foregoing exemplary embodiments.

The exemplary embodiments are examples of the invention and do not limit alternative embodiments.

In the control signal generator 3, the number of sampling points N in one scanning period (for example, N=5 in the exemplary embodiments) is preferred to be as many as possible as permitted by the processing time of the microcomputer. The detecting precision of bending can be raised using many sampling points. However, the track bending can be detected satisfactorily where the number of samples is 3 or a larger integer.

Processing is not limited to that shown in the flow charts. The timer interrupt is not absolutely necessary, and filter processing or the like may be added as required. Furthermore, detection processing of track bending is not required in every scanning period. Track bending may be detected intermittently in the system where the track bending does not change suddenly in a short period of time. Additionally, one full scanning period may not always be scanned to detecttrack bending. A specific region may be detected depending on the purpose of reproduction (for example, the video signal recorded region).

It is not required to use a microcomputer, any hardware operating equivalents may be employed. Alternatively, other elements beside the control signal generator may be implemented using software on the same or different microcomputer.

The head configuration on the cylinder 5 is not limited to the illustrated example.

In the exemplary embodiments, two kinds of pilot signals for tracking are shown. However, pilot signals of four different frequencies such as in 8 mm video tape recorder may be used. The number of frequencies and array of pilot signals are not limitative. As in DAT, the region for recording pilot signals may be provided discretely at plural positions in one track. However, in order to detect track bending, it is preferred to record pilot signals continuously in a wide range in the trackif possible.

The data composition in the track may include control information such as address information, aside from the video and audio information. Other information may also be included.

The tracking control means may include means for moving the head on the cylinder in its vertical direction. The invention is, however, particularly effective when head scanning cannot follow up the track bending as in tape traveling by capstan.

The invention may be embodied in other specific forms without departing from the spirit or essential characteristics thereof. The present embodiments are therefore to be considered in all respects as illustrative and not restrictive. The scope of the invention being indicated by the appended claims rather than by the foregoing description and all changes which come within the meaning and range of equivalency of the claims are therefore intended to be embraced therein.

What is claimed:

1. An information reproducing apparatus comprising:

a rotary cylinder having a plurality of magnetic heads, one magnetic head among the plurality of magnetic heads for reproducing a tracking pilot signal recorded on slant information tracks on a magnetic tape, tracking error detecting means for receiving said tracking pilot signal, for detecting a tracking error from said tracking pilot signal when said one magnetic head scans said magnetic tape, and for generating a tracking error signal indicating a bending pattern of said slant information track, control signal generating means for receiving said tracking error signal and for generating a control signal for controlling a scanning position of said magnetic head in response to said tracking error signal, wherein said tracking error signal has a maximum value, a minimum value and an average value within a specific scanning period, and said control signal has a value corresponding to a combination of said tracking error signal and a correction amount where said correction amount corresponds to (the maximum value+the minimum value)/2–the average value, a capstan for driving the magnetic tape, tracking control means for controlling said slant information track scanning position of said one magnetic head by adjusting the rotation of the capstan in response to said control signal.

* * * * *

UNITED STATES PATENT AND TRADE MARK OFFICE
CERTIFICATE OF CORRECTION

PATENT NO.   : 5,510,938
DATED        : April 23, 1996
INVENTOR(S)  : Sakakibara et al.

It is certified that error appears in the above-identified patent and that said Letters Patent is hereby corrected as shown below:

On title page, item [56] References Cited, Foreign Documents add:

62-267956   11/1987   Japan
    31-20609    5/1991    Japan
    0046341     2/1982    EPO
    0394457     10/1990   EPO
    62-47854    3/1987    Japan

OTHER DOCUMENTS

European Search Report 93 11 6898.

Signed and Sealed this

Seventeenth Day of September, 1996

Attest:

BRUCE LEHMAN

*Attesting Officer*   *Commissioner of Patents and Trademarks*